(12) United States Patent
Pichna et al.

(10) Patent No.: US 7,715,389 B2
(45) Date of Patent: May 11, 2010

(54) BROADCAST SUPPORT FOR MOBILE SYSTEMS

(75) Inventors: Roman Pichna, Espoo (FI); Zexian Li, Espoo (FI); Ravi Pandey, Espoo (FI)

(73) Assignee: Nokia Corporation, Espoo (FI)

( * ) Notice: Subject to any disclaimer, the term of this patent is extended or adjusted under 35 U.S.C. 154(b) by 604 days.

(21) Appl. No.: 11/605,325

(22) Filed: Nov. 29, 2006

(65) Prior Publication Data

US 2008/0123645 A1 May 29, 2008

(51) Int. Cl.
*H04L 12/28* (2006.01)
(52) U.S. Cl. .................. 370/390; 370/463
(58) Field of Classification Search .......... None
See application file for complete search history.

(56) References Cited

U.S. PATENT DOCUMENTS

| | | | |
|---|---|---|---|
| 2001/0034243 A1 | 10/2001 | Masuda et al. | |
| 2001/0055379 A1* | 12/2001 | Mamiya et al. | 379/201.05 |
| 2003/0043732 A1* | 3/2003 | Walton et al. | 370/208 |
| 2003/0097408 A1* | 5/2003 | Kageyama et al. | 709/205 |
| 2003/0211843 A1* | 11/2003 | Song et al. | 455/411 |
| 2004/0017809 A1* | 1/2004 | Park | 370/390 |
| 2004/0081192 A1* | 4/2004 | Koulakiotis et al. | 370/432 |
| 2004/0194134 A1* | 9/2004 | Gunatilake et al. | 725/38 |
| 2005/0282571 A1* | 12/2005 | Oprescu-Surcobe et al. | 455/503 |
| 2006/0155839 A1* | 7/2006 | Hundscheidt et al. | 709/224 |
| 2006/0274694 A1* | 12/2006 | Rajkumar et al. | 370/331 |
| 2007/0019645 A1* | 1/2007 | Menon | 370/390 |
| 2007/0038638 A1* | 2/2007 | Wu | 707/10 |
| 2007/0110248 A1* | 5/2007 | Li | 380/278 |
| 2007/0121629 A1* | 5/2007 | Cuijpers et al. | 370/390 |
| 2007/0130601 A1* | 6/2007 | Li et al. | 725/112 |
| 2007/0168523 A1* | 7/2007 | Jiang et al. | 709/228 |
| 2008/0037480 A1* | 2/2008 | Venkatachalam | 370/338 |

FOREIGN PATENT DOCUMENTS

| | | |
|---|---|---|
| EP | 1 718 097 A1 | 11/2006 |
| WO | WO 2006/085732 A1 | 8/2006 |
| WO | WO 2007/046597 A1 | 4/2007 |

OTHER PUBLICATIONS

International Search Report PCT/EP2007/062890 filed Nov. 27, 2007.

* cited by examiner

*Primary Examiner*—Jayanti K Patel
*Assistant Examiner*—Hooman Houshmand
(74) *Attorney, Agent, or Firm*—Alston & Bird LLP

(57) ABSTRACT

A network element provides multicast/broadcast support. The network element is configured to process streams which are transported by a media access control layer, wherein the streams use separate multicast bursts, and to process streams which are transported on an internet protocol. Each of the streams transported by the media access control layer comprises a related connection identity, and each of the streams transported on an internet protocol comprises a related internet protocol flow, wherein a mapping is present between a connection identity and an internet protocol flow for each stream.

21 Claims, 3 Drawing Sheets

BROADCAST SUPPORT FOR MOBILE SYSTEMS

FIELD OF THE INVENTION

The present invention relates to a network element, a system and a method for providing broadcast support.

BACKGROUND OF THE INVENTION

At present, there is little deployed infrastructure and terminal support for multicast-broadcast solutions in the mobile world. Known solutions include the digital video broadcasting standard for handhelds (DVB-H) and its regional variants as well as multimedia broadcast multicast service (MBMS) according to the $3^{rd}$ generation partnership project (3GPP) and other systems. DVB-H is an internet protocol (IP) based solution. Another internet protocol based broadcast solution, though in the first instance not for the mobile world, would be IP based television (IP-TV) as adopted in the DSL (digital subscriber line) world.

Apart from that, there is particularly no known existing IP-TV broadcast solution for technology corresponding to the WiMAX (worldwide interoperability for microwave access) Forum standard or its drafts.

SUMMARY OF THE PRESENT INVENTION

Thus, it is an object of the present invention to overcome the shortcomings of the prior art. In particular, but not exclusively, the present invention aims at providing broadcast support for WiMAX technology.

According to a first aspect of the present invention, there is provided a network element for providing multicast/broadcast support which is configured to process streams which are transported by a media access control layer, wherein the streams use separate multicast bursts; and process streams which are transported on an internet protocol, wherein each of the streams transported by the media access control layer comprises a related connection identity, and each of the streams transported on an internet protocol comprises a related internet protocol flow, and wherein a mapping is present between a connection identity and an internet protocol flow for each stream.

Modifications of the first aspect can include the following.

The streams which are transported on an internet protocol can be transported on an internet protocol based multicast protocol.

The network element can be further configured to effect either one of transporting streams on the mobile application part protocol and the internet protocol.

The network element can be further configured to effect the mapping between the connection identity and the internet protocol flow.

In this case, the network element can be a terminal and further configured to sequentially scan connection identities as listed in the mobile application part protocol, receive a full video frame for each connection identity, create a thumbnail image to be displayed on the terminal, and receive a particular stream upon selection per user-click on a thumbnail image.

Also in this case, the streams which are transported on an internet protocol can correspond to a session description protocol object with internet protocol information attributes comprising one of an internet protocol based multicast protocol flow and a user datagram protocol port number, and wherein the network element can be a terminal and further configured to scan connection identities as listed in the mobile application part protocol, receive internet protocol flows in each of the separate multicast bursts, create a mapping between connection identities and sessions by detecting what internet protocol flows and user datagram protocol port is used in each connection identity, receive a particular stream relating to a mapped connection identity.

Still in this case, the network element can be further configured to be operably connected to an electronic service guide/electronic program guide control channel.

Alternatively, the network element can be an access service network gateway and further configured to be operably connected with at least one base station over a first interface; be operably connected with a broadcast server over a second interface; receive broadcast data from the broadcast server; and utilize an internet protocol based multicast protocol on an internet protocol layer below a generic routing encapsulation tunnel layer over the first interface.

According to a second aspect of the present invention, there is provided a system for providing broadcast support, comprising: a broadcast server operably connected with a service unit and a content provider unit; a base transceiver unit comprising at least one base station; and a mobile terminal operably connected to the at least one base station, wherein the broadcast server is operably connected with the base transceiver unit, and the system is configured to: process streams which are transported by a media access control layer, wherein the streams use separate multicast bursts; and process streams which are transported by an internet protocol, wherein each of the streams transported by the media access control layer comprises a related connection identity, and each of the streams transported on an internet protocol comprises a related internet protocol flow, and wherein a mapping is present between a connection identity and an internet protocol flow for each stream.

Modifications of the second aspect can include the following.

The system can further comprise an access service network gateway, wherein the access service network gateway is operably connected with the base transceiver unit via a first interface and with the broadcast server via a second interface so that the broadcast server is operably connected with the base transceiver unit over the access service network gateway.

In this case, the access service network gateway can be configured to receive multicast/broadcast data from the broadcast server; and utilize an internet protocol based multicast protocol on an internet protocol layer below a generic routing encapsulation tunnel layer over the first interface.

Also in this case, the access service network gateway can be configured to operate according to the internet group management protocol.

Moreover, the broadcast server can be configured to be multicast enabled, to operate based on the internet protocol, and to process an internet protocol based television application.

The system can be further configured to operate a session description protocol comprising broadcast information in a control channel, wherein the terminal is configured to select broadcast streams based on the broadcast information.

The streams which are transported on an internet protocol can be transported on an internet protocol based multicast protocol, and the system can be further configured to effect either one of transporting streams on the mobile application part protocol and the internet protocol, and to effect the mapping between the connection identity and the internet protocol flow.

According to a third aspect of the present invention, there is provided a method of providing broadcast support, comprising: processing streams which are transported by a media access control layer, wherein the streams use separate multicast bursts; and processing streams which are transported on an internet protocol, wherein each of the streams transported by the media access control layer comprises a related connection identity, and each of the streams transported on an internet protocol comprises a related internet protocol flow, and wherein a mapping is present between a connection identity and an internet protocol flow for each stream.

Modifications of the third aspect can include the following.

The method can further comprise transporting streams on a mobile application part protocol on the media access control layer; using separate multicast bursts for the streams; transporting streams on an internet protocol; assigning a related connection identity to each of the streams transported on a mobile application part protocol; assigning a related internet protocol flow to each of the streams transported on an internet protocol; and mapping for each stream a connection identity and an internet protocol flow.

The method can further comprise receiving broadcast data by an access service network gateway from a broadcast server; and utilizing an internet protocol based multicast protocol on an internet protocol layer below a generic routing encapsulation tunnel layer over a first interface between the access service network gateway and a base transceiver unit.

In this case, the method can further comprise operating the access service network gateway according to the internet group management protocol.

Moreover, the method can further comprise operating a session description protocol comprising broadcast information in a control channel, and selecting broadcast streams by a terminal based on the broadcast information.

In addition, the method according can further comprise transporting the streams on an internet protocol based multicast protocol.

According to a fourth aspect of the present invention, there is provided a network element for providing multicast/broadcast support, comprising means for processing streams which are transported by a media access control layer, wherein the streams use separate multicast bursts; and means for processing streams which are transported on an internet protocol, wherein each of the streams transported by the media access control layer comprises a related connection identity, and each of the streams transported on an internet protocol comprises a related internet protocol flow, and wherein a mapping is present between a connection identity and an internet protocol flow for each stream.

According to a fifth aspect of the present invention, there is provided a system for providing multicast/broadcast support, comprising: broadcast server means operably connected with service means and content provider means; base transceiver means comprising at least one base station, the base transceiver means being operably connected with the broadcast server means; mobile terminal means operably connected to the at least one base station; means for processing streams which are transported by a media access control layer, wherein the streams use separate multicast bursts; and means for processing streams which are transported on an internet protocol, wherein each of the streams transported by the media access control layer comprises a related connection identity, and each of the streams transported on an internet protocol comprises a related internet protocol flow, and wherein a mapping is present between a connection identity and an internet protocol flow for each stream.

According to a sixth aspect of the present invention, there is provided a computer program product having computer readable instructions stored thereon, the instructions including processing streams which are transported by a media access control layer, wherein the streams use separate multicast bursts; and processing streams which are transported on an internet protocol, wherein each of the streams transported by the media access control layer comprises a related connection identity, and each of the streams transported on an internet protocol comprises a related internet protocol flow, and wherein a mapping is present between a connection identity and an internet protocol flow for each stream.

BRIEF DESCRIPTION OF THE DRAWINGS

Further details, features and advantages of the present invention may become more readily understandable from the following description of its preferred embodiments which is to be taken in conjunction with the appended drawings, in which.

DESCRIPTION OF THE PREFERRED EMBODIMENTS

Figure 1:
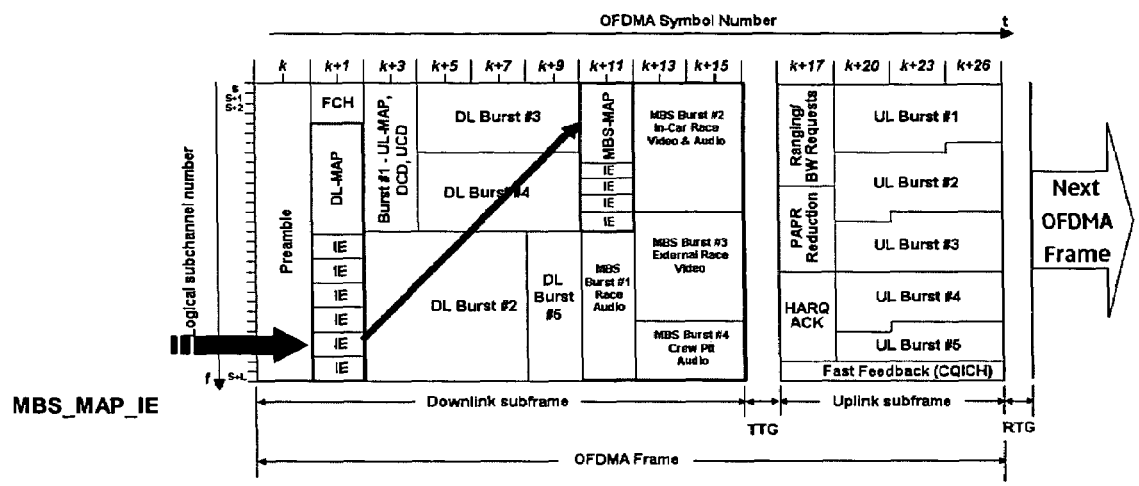
FIG. 1 shows the frame structure for multicast and broadcast as standardized in IEEE 802.16e-2005.

In the following, a description is presented of what are presently considered to be preferred embodiments of the present invention. It is, however, to be expressly understood that the present invention is not to be construed as being limited to the described embodiments.

Specifically, in order to illustrate the present invention, in the following, embodiments thereof are described by making reference to the example of a regional broadcast at a racing event.

One embodiment of the present invention is to enable the usage of existing IP TV solutions from the DSL (fixed broadband) and DVB-H worlds on top of a WiMAX system. An advantage of this embodiment is that efforts to adapt existing systems are minimized, and e.g. so-called commercial off-the-shelf (COTS) video broadcasting infrastructure and terminal clients can be reused.

Accordingly, the present embodiment includes that a WiMAX system supports IPv4 (internet protocol version 4) or IPv6 (internet protocol version 6) multicast and mapping of those streams onto multicast/broadcast service flow identities (SFID)/connection identities (CID) in the media access control (MAC) layer according to the standard 802.16e of the IEEE (institute of electrical and electronics engineers).

For a deeper understanding of the preferred embodiments of the present invention, the above introduced example of a racing event is illustrated below in more detail.

The following use cases shall be considered.

End User:

A person attending races has either purchased or rented a terminal peculiar to a particular racing event with a large (for a handset) screen and a broadcast client. Anybody with such a terminal can watch and listen. A user can select among several views, e.g. pit lane, finish line, interesting curve with a major pile-up, helicopter view, scoring/grading/ranking view, etc. The user will be mostly outdoors in the viewing area, but can use the terminal also indoors.

WiMAX Operator:

One video stream for small screens may need up to 500 kb/s. Assuming that the WiMAX capacity per sector is 5 Mb/s (e.g. quadrature phase-shift keying (QPSK) with ½-rate forward error correction (FEC) without repetition in a 10 MHz carrier with a downlink (DL)/uplink (UL) ratio of 3:1). It is lower than the aggregated unicast capacity, because it is determined by the cell-edge performance. Thus, there is space for 10 video streams. If an operator does not want to dedicate the capacity solely for broadcast, it could reserve 50% of the capacity for other traffic, such as browsing, emailing etc. which would then mean 5 video streams viewable in the broadcast area. The operator rents this capacity to the venue/event owner and offers a local interface for receiving the contents/streams.

Venue Owner:

The venue owner arranges the video shooting or buys the contents from a local TV company already present at the event and feeds the contents to a locally-available interface of the WiMAX operator. The venue owner collects payments for renting the terminals and pays the WiMAX operator and video operator for the used capacity and contents. If users bring along own terminals they are still paying the entrance fee and the streaming enhances their entertainment experience. Broadcast is not necessarily seen as a separate business, but rather as an attraction point or enhancer of the main source of revenue.

From the relevant standards, the WiMAX Forum has not yet (at the time of the present invention) considered a technical specification for multicast or broadcast. However, there is some support for multicast-broadcast in the standard 802.16e of the IEEE (institute of electrical and electronics engineers). FIG. 1 shows the frame structure for multicast and broadcast as standardized in IEEE 802.16e-2005.

In order for a terminal such as a mobile station (MS) to find out the multicast/broadcast service (MCBCS) portion in one frame, inside the downlink mobile application part (DL-MAP) element, the base stations (BS) need to transmit the information element MBS_MAP_IE which is used to indicate when the next data for a MCBC service flow will be transmitted. After receiving the DL-MAP message, terminals (MS) will know the starting location of MCBC parts. Since it is very likely that there are more than one MCBCS burst, another MAP message MBS_MAP, which is located from the first sub-channel and the first OFDMA (orthogonal frequency domain multiple access) symbol of MCBCS region, is necessary. The MBS_MAP message is used to describe the MCBCS connections serviced by the MCBCS portion. From the MBS_MAP message, terminals (MS) will recognize how many channels are served, as well as the corresponding multicast connection identities (CID), sub-channel information etc.

In summary, there are two steps for a terminal (MS) to find out the MCBCS sub-channel. The first step is to find out the location of MBS_MAP by MBS_MAP_IE, and the second step is to find out the MCBCS sub-channels by MBS_MAP.

Thus, a preferred embodiment of the present invention provides a broadcast architecture for WiMAX based on IP TV. The architecture according to the present embodiment enables implementing broadcast over WiMAX using known IP TV solutions.

The present embodiment includes mapping the IP TV broadcast solution to the WiMAX system. Unlike IP TV with/for DSL technology, the network elements below the access service network gateway (ASN-GW) as the equivalent to a digital subscriber line access multiplexer (DSLAM) also take part in the broadcast.

Specifically, according to the present embodiment there is effected a mapping between an IP flow and the MBS-CID, wherein an IP flow is defined by IP addresses (source and destination), the carried protocol type (user datagram protocol or transmission control protocol), and the port number. In detail, one particular option includes that there is a WiMAX-specific mapping between session descriptors as offered by the session description protocol (SDP) or similar means to the respective WiMAX "bearer" identifier, MBS-CID.

As a particular preferred option, there is provided an internet protocol based multicast protocol (IP-M) in the interface R6, i.e. between an access service network gateway and a base station (BS)/base transceiver system (BTS) on the transport IP layer. In DSL systems, a line between a terminal and DSLAM is not shared by several terminals/modems, it is a per household telephone line. However, according to WiMAX, all resources between the terminal and network are shared, including radio and transport to a BS. It is to be noted that a WiMAX ASN-GW acts like DSLAM and joins multicast trees. Because of the shared R6 and R1 interfaces (between BS/BTS and terminals) in the WiMAX case, it is beneficial if the multicast functionality could be used there as well. In R1 interface, it is done using the existing MBS functionality of 802.16e, and in R6 interface, it is done using IP based multicast protocol on the IP layer below the generic routing encapsulation (GRE) tunnel. In this way, precious resources of the last hop transport are shared between all base stations (sectors) of one BTS (base station site).

The above outlined implementation aspects of the present preferred embodiment are described herein below in further detail by way of even more specific preferred embodiments including even more detailed options.

Broadcast Architecture for WiMAX

In account of the advantage not to have to create a completely new and proprietary system including terminal clients and streaming infrastructure, another preferred embodiment is based on existing/legacy technology. Based on the maturity of IP TV and also the targeted IP and DSL paradigms, the present embodiment adapts technology from IP TV as used by present DSL operators.

The benefit in adopting the DSL IP TV solution is that most of the complexity is moved to the application layer, since access control, stream encryption, and programming information channel is all available at the application level.

Figure 2:
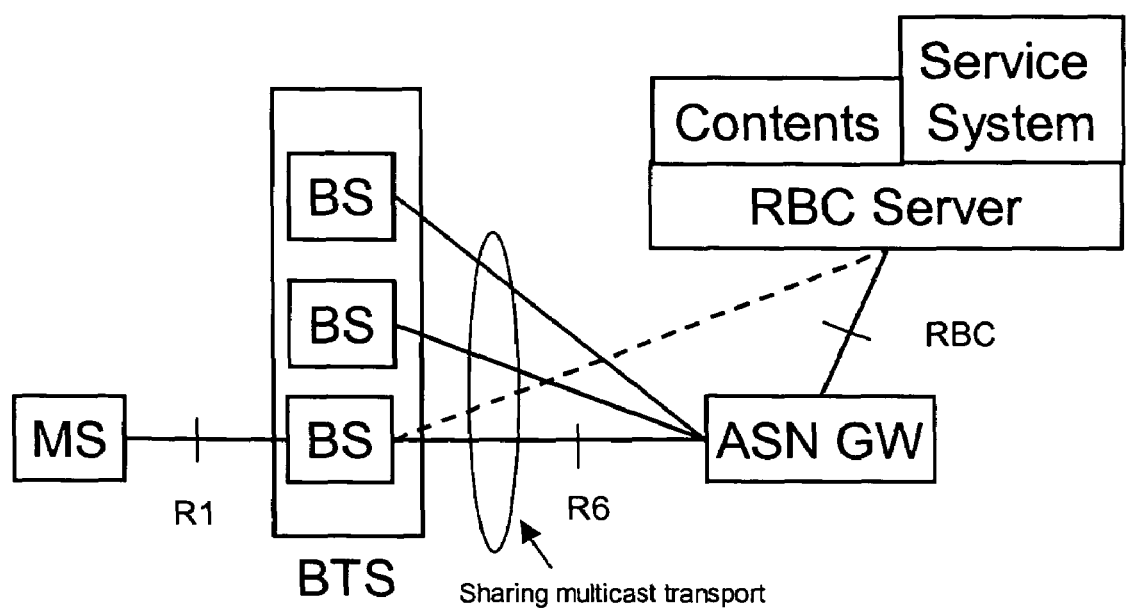
FIG. 2 shows a broadcast architecture according to an embodiment of the present invention.

The architecture according to the present embodiment is shown in FIG. 2.

Notable differences to the known architectures include the absence of interface R3 reference point (RP), a mobile internet protocol (MIP) based home agent (HA), and an authentication, authorization and accounting (AAA) server.

The reason why a home agent (HA) can be omitted is that mobile internet protocol (MIP) supports multicast in such a way that the home agent (HA) replicates a multicast stream into multiple unicast streams to all users that have joined a particular multicast tree. This renders the whole multicast useless, since it results in replicating and unicasting the streams via the radio interface.

Therefore, according to the present embodiment there is the option to feed the streaming multicast or broadcast data either into the base station (BS) directly or into the access service network gateway (ASN-GW).

The preferred solution is to feed the streams into ASN-GW and not BS. The reasons are that the number of required physical/logical interfaces and interconnections on the site are minimized at the expense of a local "small" ASN-GW at the site, and that it is assured that BS needs to support only standard R6 interface.

The same approach can then be used for feeding a satellite (SAT) TV signal into a WiMAX distribution network to save the transport capacity.

The reasons why a AAA server can be omitted are that there is no user-specific or subscription-specific AAA functionality required: Thus, there is no authentication, no authorization nor accounting.

The reference points as shown in FIG. 2 are as follows.

The interface R1 transports multicast service flows in DL MAC per IP multicast stream. There is no broadcast-related UL signaling across R1.

The interface R6 supports multicast GRE flow per IP multicast stream. For the cases of several BS sharing the same site or BTS, it is beneficial if the transport solution below interface R6 supports multicast. Therefore, the BTS transport module should support IP multicast for multi-sector BTS.

The interface RBC is a regular IP interface. The ASN-GW is a multicast node and configured to issue an internet group management protocol version 2 (IGMPv2) join signal to start receiving all the multicast flows via interface RBC.

It is to be noted that the IGMP support in interface RBC is merely an option, since streams can be fed into ASN-GW via any unicast. However, IGMP support in interface RBC simplifies the terminal design (IP stack, addressing, channel switching, etc.) and enables the reuse of the existing IP TV infrastructure/architecture including clients.

The nodes as shown in FIG. 2 are as follows.

The RBC (e.g. regional broadcast) server is an IP multicast server with an IP TV multicast application running.

The ASN-GW is configured to join the multicast tree in RBC server. It issues the IGMP join signal for all pre-configured IP-M flows, and maintains the mapping between an IP-M flow and a multicast GRE flow. If available, it maps GRE multicast flows to transport multicast on R6 interface. Furthermore, it maintains mapping between R6 transport IP-M flow and GRE multicast flows.

The terminal MS selects a broadcast stream based on the received or configured session information. Broadcast information may be received as a session description protocol (SDP) in a control channel, as a web request, or it is pre-configured.

The base station BS joins IP-M transport trees between ASN-GW and BS for all pre-configured flows. Further, it receives each user IP-M flow in a separate GRE flow on top of transport IP-M, and it maps each of them into separate SFID/CID and broadcasts them. The BS reserves enough resources for each flow.

Figure 3:
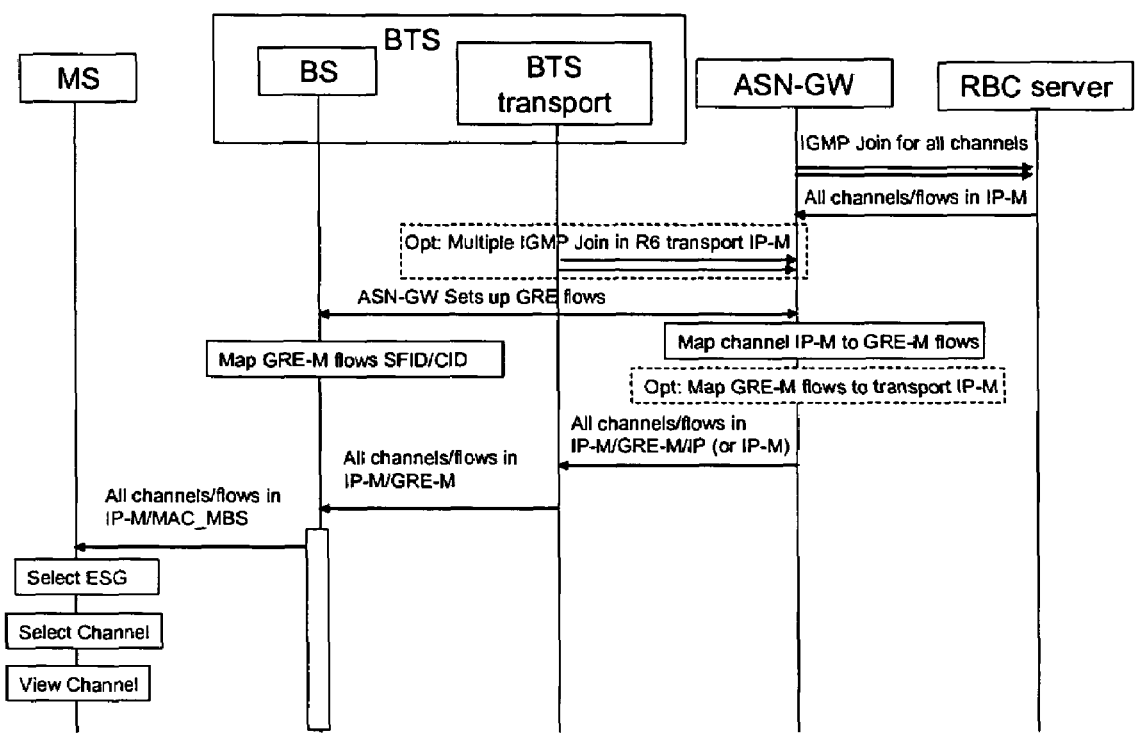
FIG. 3 shows a broadcast signaling flow according to an embodiment of the present invention.

FIG. 3 shows a signaling flow depicting particularities of the preferred embodiments described here. That is, the operations as illustrated in FIG. 3 summarize particularities from the present overall description of preferred embodiments of the present invention. Hence, for a description of the depicted details of FIG. 3, reference is made to respective sub-sections of the present overall description of preferred embodiments of the present invention.

Mapping Between IP Flow and MBS-CID

Preferred embodiments for executing the above described mapping between session descriptors as delivered in SDP or similar means and WiMAX "bearer"-specific identifiers, such as MBS-CID are described in more detail below.

There are several levels of multiplexing video streams. To save the terminal battery power, the streams have to be multiplexed at MAC MAP level, while using separate multicast bursts. The multicast bursts carry multicast streams marked with their identifiers, i.e. CID. This arrangement enables the terminal to receive only the desired stream instead of all, and then to select the stream at application or IP level.

To be aligned with infrastructure and client solutions from DSL and DVB-H worlds, the streams are multiplexed at IP level as well. This may be preferably done by using IP multicast (IP-M).

Accordingly, the MAC (MBS-CID) level multiplexing and the IP-M level multiplexing are to be mapped.

DVB-H includes an IP flow in the signaling from the network. However, there is no such field in the MBS-MAP information elements (IE). Therefore, the mapping between the IP flow and CID has to be provisioned somewhere else. In the following, respective examples as further preferred embodiments are described.

That is, there are several alternative procedures for obtaining the mapping and channel selection.

One way is for the terminal to sequentially scan all multicast CID (MBS-CID) as listed in MBS-MAP, receive a full video frame for each, and create thumbnail images for the user. Users can click on one and in such a way select receiving of a particular stream.

If via electronic service guide/electronic program guide (ESG/EPG) or hyper-text transfer protocol (http) or by any other means an SDP object with session description is obtained, IP session information attributes such as IP-M flow and user datagram protocol (UDP) port number become available. The mapping between the IP flow and MBS-CID is not available yet. The terminal will then scan MBS-CID as listed in MBS-MAP to receive IP flows in each MBS-CID burst and create a map between MBS-CID and sessions by detecting what IP flow and UDP port is used in each MBS-CID. Following the channel selection based on higher layer information, the terminal can start receiving the particular stream behind the mapped MBS-CID.

If an ESG/EPG control channel is available, it will carry all the necessary information such as IP-M flow and UDP port number. For WiMAX purposes the ESG channel information can be augmented also with MBS-CID IE, a WiMAX-specific extension. The identities (MBS-CIDs) of the MBS bursts have to be then fixed and synchronized between ESG and BS MAC.

As still another alternative, clicking a webpage with thumbnails of video pictures and names of the channel hyper-text transfer protocol will fetch SDP and MBS-CID information that is then used for selecting the viewed channel. Then, the identities (MBS-CID) of the MBS bursts have to be fixed and synchronized between the web server and BS MAC.

IP-M in R6 Transport (Below GRE)

Because of the shared R6 and R1 interfaces, it is beneficial if the multicast functionality could be used there as well. In R1 interface it is done using the existing MBS functionality of 802.16e and in R6 interface it can be done using IP multicast protocol on the IP layer below the GRE tunnel. In this way, precious resources of the last hop transport are shared among all base stations of one BTS.

According to the above described preferred embodiments, there is provided multicast/broadcast support in a comparably simple manner, which however provides a satisfying capability.

Specifically, the above described preferred embodiments of the present invention include a network element which provides multicast/broadcast support. The network element is configured to process streams which are transported by a media access control layer, wherein the streams use separate multicast bursts, and to process streams which are transported on an internet protocol. Each of the streams transported by the media access control layer comprises a related connection identity, and each of the streams transported on an internet protocol comprises a related internet protocol flow, wherein a mapping is present between a connection identity and an internet protocol flow for each stream.

What has been described above is what is presently considered to be preferred embodiments of the present invention. However, as is apparent to the skilled reader, these are provided for illustrative purposes only and are in no way intended to be construed that the present invention is restricted thereto. Rather, it is the intention that all variations and modifications be included which fall within the spirit and scope of the appended claims.

The invention claimed is:

1. An apparatus comprising at least one memory including computer program code, and at least one processor, the at least one memory and the computer program code being configured, with the processor, to cause the apparatus at least to:
   process streams which are transported by a media access control layer, wherein the streams transported by the media access control layer use separate multicast bursts;
   process streams which are transported on an internet protocol, wherein each of the streams transported by the media access control layer comprise a related connection identity, and each of the streams transported on an internet protocol comprise a related internet protocol flow and correspond to a session description protocol object with internet protocol information attributes comprising one of an internet protocol based multicast protocol flow or a user datagram protocol port number;
   map a connection identity and an internet protocol flow for each stream;
   scan connection identities as listed in the mobile application part protocol;
   receive internet protocol flows in each of the separate multicast bursts;
   create a mapping between connection identities and sessions by detecting what internet protocol flows and user datagram protocol port is used in each connection identity; and
   receive a particular stream relating to a mapped connection identity.

2. The apparatus according to claim 1, wherein the streams which are transported on an internet protocol are transported on an internet protocol based multicast protocol.

3. The apparatus according to claim 1, wherein the memory and the computer program code are further configured, with the processor, to cause the apparatus at least to effect either one of transporting streams on the mobile application part protocol and the internet protocol.

4. The apparatus according to claim 1, wherein the apparatus comprises a terminal, and the memory and the computer program code are further configured, with the processor, to cause the apparatus at least to
   sequentially scan connection identities as listed in the mobile application part protocol,
   receive a full video frame for each connection identity,
   create a thumbnail image to be displayed on the terminal, and
   receive a particular stream upon selection per user-click on a thumbnail image.

5. The apparatus according to claim 1, wherein the memory and the computer program code are further configured, with the processor, to cause the apparatus at least to
   communicate with an electronic service guide/electronic program guide control channel.

6. The apparatus according to claim 1, wherein the apparatus is an access service network gateway, and the memory and the computer program code are further configured, with the processor, to cause the apparatus at least to
   communicate with at least one base station over a first interface,
   communicate with a broadcast server over a second interface,
   receive broadcast data from the broadcast server, and
   utilize an internet protocol based multicast protocol on an internet protocol layer below a generic routing encapsulation tunnel layer over the first interface.

7. A system comprising:
   a broadcast server operably connected with a service unit and a content provider unit;
   a base transceiver unit comprising at least one base station; and
   a mobile terminal operably connected to the at least one base station, wherein the broadcast server is operably connected with the base transceiver unit, and
   the system is configured to:
   process streams which are transported by a media access control layer, wherein the streams which are transported by the media access control layer use separate multicast bursts,
   process streams which are transported by an internet protocol, wherein each of the streams transported by the media access control layer comprise a related connection identity, and each of the streams transported on an internet protocol comprise a related internet protocol flow and correspond to a session description protocol object with internet protocol information attributes comprising one of an internet protocol based multicast protocol flow or a user datagram protocol port number, and
   map a connection identity and an internet protocol flow for each stream;
   scan connection identities as listed in the mobile application part protocol;
   receive internet protocol flows in each of the separate multicast bursts;
   create a mapping between connection identities and sessions by detecting what internet protocol flows and user datagram protocol port is used in each connection identity; and
   receive a particular stream relating to a mapped connection identity.

8. The system according to claim 7, further comprising, an access service network gateway,
   wherein the access service network gateway is operably connected with the base transceiver unit via a first interface and with the broadcast server via a second interface so that the broadcast server is operably connected with the base transceiver unit over the access service network gateway.

9. The system according to claim 8, wherein the access service network gateway is configured to
   receive multicast/broadcast data from the broadcast server; and
   utilize an internet protocol based multicast protocol on an Internet protocol layer below a generic routing encapsulation tunnel layer over the first interface.

10. The system according to claim 8, wherein the access service network gateway is configured to operate according to the internet group management protocol.

11. The system according to claim 7, wherein the broadcast server is configured to be multicast enabled, to operate based on the internet protocol, and to process an internet protocol based television application.

12. The system according to claim 7, further configured to operate a session description protocol comprising broadcast information in a control channel,
wherein the terminal is configured to select broadcast streams based on the broadcast information.

13. The system according to claim 7, wherein the streams which are transported on an internet protocol are transported on an internet protocol based multicast protocol, and the system is further configured to effect either one of transporting streams on the mobile application part protocol and the internet protocol.

14. A method comprising:
processing streams which are transported by a media access control layer, wherein the streams transported by the media access control layer use separate multicast bursts;
processing streams which are transported on an internet protocol, wherein each of the streams transported by the media access control layer comprise a related connection identity, and each of the streams transported on an internet protocol comprise a related internet protocol flow and correspond to a session description protocol object with internet protocol information attributes comprising one of an internet protocol based multicast protocol flow or a user datagram protocol port number;
mapping a connection identity and an internet protocol flow for each stream;
scanning connection identities as listed in the mobile application part protocol;
receiving internet protocol flows in each of the separate multicast bursts;
creating a mapping between connection identities and sessions by detecting what internet protocol flows and user datagram protocol port is used in each connection identity; and
receiving a particular stream relating to a mapped connection identity.

15. The method according to claim 14, further comprising transporting streams on a mobile application part protocol on the media access control layer;
using separate multicast bursts for the streams;
transporting streams on an internet protocol;
assigning a related connection identity to each of the streams transported on a mobile application part protocol; and
assigning a related internet protocol flow to each of the streams transported on an internet protocol.

16. The method according to claim 14, further comprising:
receiving broadcast data by an access service network gateway from a broadcast server; and
utilizing an internet protocol based multicast protocol on an internet protocol layer below a generic routing encapsulation tunnel layer over a first interface between the access service network gateway and a base transceiver unit.

17. The method according to claim 16, further comprising:
operating the access service network gateway according to the internet group management protocol.

18. The method according to claim 14, further comprising:
operating a session description protocol comprising broadcast information in a control channel; and
selecting broadcast streams by a terminal based on the broadcast information.

19. The method according to claim 14, wherein the streams transported on an internet protocol are transported on an internet protocol based multicast protocol.

20. An apparatus comprising
means for processing streams which are transported by a media access control layer, wherein the streams transported by the media access control layer use separate multicast bursts;
means for processing streams which are transported on an internet protocol, wherein each of the streams transported by the media access control layer comprise a related connection identity, and each of the streams transported on an internet protocol comprise a related internet protocol flow and correspond to a session description protocol object with internet protocol information attributes comprising one of an internet protocol based multicast protocol flow or a user datagram protocol port number;
means for mapping a connection identity and an internet protocol flow for each stream;
means for scanning connection identities as listed in the mobile application part protocol;
means for receiving internet protocol flows in each of the separate multicast bursts;
means for creating a mapping between connection identities and sessions by detecting what internet protocol flows and user datagram protocol port is used in each connection identity; and
means for receiving a particular stream relating to a mapped connection identity.

21. A system comprising:
broadcast server means operably connected with service means and content provider means;
base transceiver means comprising at least one base station, the base transceiver means being operably connected with the broadcast server means;
mobile terminal means operably connected to the at least one base station;
means for processing streams which are transported by a media access control layer, wherein the streams transported by the media access control layer use separate multicast bursts;
means for processing streams which are transported on an internet protocol, wherein each of the streams transported by the media access control layer comprise a related connection identity, and each of the streams transported on an internet protocol comprise a related internet protocol flow and correspond to a session description protocol object with internet protocol information attributes comprising one of an internet protocol based multicast protocol flow or a user datagram protocol port number;
means for mapping a connection identity and an internet protocol flow for each stream;
means for scanning connection identities as listed in the mobile application part protocol;
means for receiving internet protocol flows in each of the separate multicast bursts;
means for creating a mapping between connection identities and sessions by detecting what internet protocol flows and user datagram protocol port is used in each connection identity; and
means for receiving a particular stream relating to a mapped connection identity.

* * * * *